United States Patent
Hirai et al.

(10) Patent No.: US 9,068,049 B2
(45) Date of Patent: Jun. 30, 2015

(54) CURABLE SILICONE COMPOSITION AND CURED PRODUCT THEREOF

(71) Applicant: Dow Corning Toray Co., Ltd., Tokyo (JP)

(72) Inventors: Kazuo Hirai, Sodegaura (JP); Makoto Yoshitake, Ichihara (JP)

(73) Assignee: DOW CORNING TORAY CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/348,079

(22) PCT Filed: Sep. 27, 2012

(86) PCT No.: PCT/JP2012/075737
§ 371 (c)(1),
(2) Date: Mar. 28, 2014

(87) PCT Pub. No.: WO2013/047898
PCT Pub. Date: Apr. 4, 2013

(65) Prior Publication Data
US 2014/0288235 A1    Sep. 25, 2014

(30) Foreign Application Priority Data
Sep. 29, 2011    (JP) .................................. 2011-215678

(51) Int. Cl.
| | | |
|---|---|---|
| *C08G 77/44* | (2006.01) | |
| *C08L 83/04* | (2006.01) | |
| *C08L 83/10* | (2006.01) | |
| *C08G 77/12* | (2006.01) | |
| *C08G 77/20* | (2006.01) | |

(52) U.S. Cl.
CPC ................ *C08G 77/44* (2013.01); *C08G 77/12* (2013.01); *C08G 77/20* (2013.01); *C08L 83/04* (2013.01); *C08L 83/10* (2013.01)

(58) Field of Classification Search
CPC ......... C08L 83/10; C08G 77/12; C08G 77/20
USPC .......................................... 524/558; 525/478
See application file for complete search history.

(56) References Cited

U.S. PATENT DOCUMENTS 5,160,681 A * 11/1992 Shimizu ........................ 264/128

FOREIGN PATENT DOCUMENTS

| JP | 2006-335857 A | 12/2006 |
| JP | 2007-039483 A | 2/2007 |
| WO | WO 03/035762 A1 | 5/2003 |

OTHER PUBLICATIONS

International Search Report for Application No. PCT/JP2012/075737 dated Jan. 3, 2013, 3 pages.
English language abstract and machine-assisted English translation for JP 2006-335857 extracted from the PAJ database on Jun. 26, 2014, 32 pages.
English language abstract and machine-assisted English translation for JP 2007-039483 extracted from the PAJ database on Jun. 26, 2014, 29 pages.

* cited by examiner

*Primary Examiner* — Doris Lee
(74) *Attorney, Agent, or Firm* — Howard & Howard Attorneys PLLC

(57) ABSTRACT

A curable silicone composition comprising: (A) an organopolysiloxane that has at least a straight-chain polysiloxane block represented by the general formula: $-R^1R^2SiO)_m-$, wherein $R^1$ is a $C_{1-6}$ alkyl group or the phenyl group, $R^2$ is a $C_{2-10}$ alkenyl group, and m is a positive number from 5 to 50; (B) an organopolysiloxane that has at least a straight-chain polysiloxane block represented by the general formula: $-(R^3HSiO)_n-$, wherein $R^3$ is a $C_{1-6}$ alkyl group or the phenyl group and n is a positive number from 10 to 100; and (C) a hydrosilylation reaction catalyst, cures to form a cured product that has a small thermal expansion coefficient.

15 Claims, No Drawings

CURABLE SILICONE COMPOSITION AND CURED PRODUCT THEREOF

RELATED APPLICATIONS

This application is the National Stage of International Patent Application No. PCT/JP2012/075737, filed on Sep. 27, 2012, which claims priority to and all the advantages of Japanese Patent Application No. JP 2011-215678, filed on Sep. 29, 2011, the content of which is incorporated herein by reference.

TECHNICAL FIELD

The present invention relates to a curable silicone composition, and to a cured product thereof.

BACKGROUND ART

Curable silicone compositions that cure by the hydrosilylation reaction exhibit an excellent heat resistance, excellent cold resistance, and excellent electrical insulation performance and as a result are widely used in electrical and electronic applications. The cured products provided by the cure of these compositions generally have a large thermal expansion coefficient. As a result, when such a cured product is used to form a single article with another member, strain may be generated at the cured product/other member interface accompanying temperature variations, and delamination may occur or the single article may itself undergo rupture. The incorporation of large amounts of an inorganic filler into curable silicone compositions in order to lower the thermal expansion coefficient of the cured product is well known, but accrues the problems of a substantial increase in the viscosity of the resulting composition and diminished handling characteristics therefore and an impaired flexibility for the resulting cured product.

Curable silicone compositions that provide a cured product with a reduced thermal expansion coefficient can be exemplified by the following: a curable silicone composition comprising: a straight-chain organopolysiloxane that contains at least two alkenyl groups in one molecule; a branched-chain organopolysiloxane that contains at least three alkenyl groups in one molecule; a branched-chain organopolysiloxane that contains at least three silicon-bonded hydrogen atoms in one molecule; and a hydrosilylation reaction catalyst (refer to Japanese Unexamined Patent Application Publication (hereinafter referred to as "Kokai") 2006-335857); and a curable silicone composition comprising: a branched-chain organopolysiloxane that contains alkenyl and phenyl groups; a straight-chain organopolysiloxane that contains at least two alkenyl groups in one molecule; a branched-chain organopolysiloxane that contains at least three silicon-bonded hydrogen atoms in one molecule; and a hydrosilylation reaction catalyst (refer to Kokai 2007-39483).

However, even these curable silicone compositions have not been able to provide a satisfactory reduction in the thermal expansion coefficient of the cured product.

An object of the present invention is to provide a curable silicone composition that forms a cured product that has a small thermal expansion coefficient. A further object of the present invention is to provide a cured product that has a small thermal expansion coefficient.

DISCLOSURE OF INVENTION

The curable silicone composition of the present invention characteristically comprises:

(A) an organopolysiloxane that has at least a straight-chain polysiloxane block represented by the following general formula:

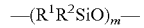
$$-(R^1R^2SiO)_m-$$

wherein $R^1$ is a $C_{1-6}$ alkyl group or a phenyl group, $R^2$ is a $C_{2-10}$ alkenyl group, m is a positive number from 5 to 50, and the content of this straight-chain polysiloxane block is 20 to 60 mass % of the total amount of the organopolysiloxane in this composition;

(B) an organopolysiloxane that has at least a straight-chain polysiloxane block represented by the following general formula:

$$-(R^3HSiO)_n-$$

wherein $R^3$ is a $C_{1-6}$ alkyl group or a phenyl group and n is a positive number from 10 to 100, in a quantity that provides from 0.5 to 5 moles of the silicon-bonded hydrogen atoms in this component per 1 mole of the alkenyl groups in component (A); and (C) a hydrosilylation reaction catalyst in a catalytic quantity.

The cured product of the present invention is characteristically provided by the cure of the curable silicone composition indicated above.

Effects of Invention

The curable silicone composition of the present invention characteristically cures to form a cured product that has a small thermal expansion coefficient. The cured product according to the present invention characteristically has a low thermal expansion coefficient.

DETAILED DESCRIPTION OF THE INVENTION

The curable silicone composition of the present invention will be described in detail first.

Component (A) is an organopolysiloxane that has at least a straight-chain polysiloxane block represented by the general formula:

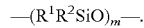
$$-(R^1R^2SiO)_m-.$$

$R^1$ in this formula is a $C_{1-6}$ alkyl group or the phenyl group. The alkyl group represented by $R^1$ can be exemplified by methyl, ethyl, propyl, butyl, pentyl, hexyl, heptyl, cyclopentyl, cyclohexyl, and cycloheptyl. $R^2$ in the formula is a $C_{2-10}$ alkenyl group and can be exemplified by vinyl, allyl, butenyl, pentenyl, and hexenyl. m in the formula is a positive number from 5 to 50 and preferably from 5 to 30. The reasons for this are as follows: the thermal expansion coefficient of the resulting cured product is substantially reduced when m is at least as large as the lower limit on the indicated range, while the mechanical strength of the resulting cured product is elevated when m does not exceed the upper limit on the indicated range.

Component (A) can be exemplified by an organopolysiloxane that is composed of only the above-described straight-chain polysiloxane block and that is chain-stopped at both of its molecular chain terminals. The group at the molecular chain terminals can be exemplified by the hydroxyl group; alkoxy groups such as methoxy, ethoxy, and propoxy; and organosiloxy groups such as trimethylsiloxy, dimethylvinylsiloxy, dimethylphenylsiloxy, and methylphenylvinylsiloxy. Component (A) can also be exemplified by a block copolymer in which the above-described straight-chain polysiloxane block (X) is connected to another siloxane block (Y). This block copolymer can be exemplified by an XY copolymer in which one X is connected to one Y; an XYX copolymer in which X is bonded at both terminals of Y; and an $(XY)_z$ copolymer in which X and Y are repeated in alternation z times. There are no particular limitations on the molecular structure of the siloxane block (Y), and the molecular structure of the siloxane block (Y) can be exemplified by straight chain, partially branched straight chain, and branched chain. The straight chain siloxane block (Y) can be exemplified by a siloxane represented by the following general formula or a polysiloxane comprising a repetition of this siloxane, $$—(R^1{}_2SiO)—.$$

The partially branched straight chain or branched chain siloxane block (Y) is bonded to the polysiloxane blocks (X) by at least two siloxane bonds, and can be exemplified by a polysiloxane comprising: $R^1SiO_{3/2}$ siloxane unit and $R^1{}_2SiO_{2/2}$ siloxane unit; a polysiloxane comprising: $R^1{}_3SiO_{1/2}$ siloxane unit, $R^1SiO_{3/2}$ siloxane unit, and $R^1{}_2SiO_{2/2}$ siloxane unit; a polysiloxane comprising: $R^1SiO_{3/2}$ siloxane unit, $R^1{}_2SiO_{2/2}$ siloxane unit, and $SiO_{4/2}$ siloxane unit; a polysiloxane comprising: $R^1{}_3SiO_{1/2}$ siloxane unit and $SiO_{4/2}$ siloxane unit; and a polysiloxane comprising: $R^1{}_3SiO_{1/2}$ siloxane unit, $R^1{}_2SiO_{2/2}$ siloxane unit, and $SiO_{4/2}$ siloxane unit. In the above formulae, $R^1$ is a $C_{1-6}$ alkyl group or a phenyl group as provided above. The group at the molecular chain terminals of this block copolymer can be exemplified by the hydroxyl group, the same alkoxy groups as provided above, and the same organosiloxy groups as provided above.

An organopolysiloxane is generally produced by polymerizing a cyclic diorganosiloxane by a re-equilibration reaction in the presence of a base catalyst or an acid catalyst; however, it is difficult with this method to produce a block copolymer that retains the straight-chain polysiloxane block described above. Due to this, the method for producing the block copolymer under consideration can be exemplified by methods in which a condensation reaction is carried out between a polysiloxane having the straight-chain polysiloxane block described above and a siloxane or polysiloxane having the other siloxane block (Y).

The component (A) content in this composition is an amount that provides a content of the above-described straight-chain polysiloxane block that is 20 to 60 mass %, and preferably 30 to 50 mass %, of the total amount of the organopolysiloxane in this composition. The reasons for this are as follows: the thermal expansion coefficient of the resulting cured product is substantially reduced when the content of this straight-chain polysiloxane block is at least as large as the lower limit for the indicated range, while the resulting cured material exhibits an elevated flexibility and mechanical strength when the upper limit for the indicated range is not exceeded.

Component (B) is an organopolysiloxane that has at least a straight-chain polysiloxane block represented by the general formula:

$$—(R^3HSiO)_n—.$$

$R^3$ in this formula is a $C_{1-6}$ alkyl group or a phenyl group. The alkyl group represented by $R^3$ can be exemplified by methyl, ethyl, propyl, butyl, pentyl, hexyl, heptyl, cyclopentyl, cyclohexyl, and cycloheptyl. n in the preceding formula is a positive number from 10 to 100 and is preferably a positive number from 20 to 80. The reasons for this are as follows: the thermal expansion coefficient of the resulting cured product is substantially reduced when n is at least as large as the lower limit for the indicated range, while the resulting cured product exhibits an elevated mechanical strength when the upper limit for the indicated range is not exceeded.

Component (B) can be exemplified by an organopolysiloxane that is composed of only the above-described straight-chain polysiloxane block and that is chain-stopped at both of its molecular chain terminals. The group at the molecular chain terminals can be exemplified by the hydroxyl group; alkoxy groups such as methoxy, ethoxy, and propoxy; and organosiloxy groups such as trimethylsiloxy, dimethylhydrogensiloxy, dimethylphenylsiloxy, and methylphenylhydrogensiloxy. Component (B) can also be exemplified by a block copolymer in which the above-described straight-chain polysiloxane block (X') is connected to another siloxane block (Y). This block copolymer can be exemplified by an X'Y copolymer in which one X' is connected to one Y; an X'YX' copolymer in which X' is bonded at both terminals of Y; and an $(X'Y)_z$ copolymer in which X' and Y are repeated in alternation z times. This siloxane block (Y) can be exemplified by the same siloxane block as above. The group at the molecular chain terminals of this block copolymer can be exemplified by the hydroxyl group, the same alkoxy groups as provided above, and the same organosiloxy groups as provided above.

The content of component (B) is an amount that provides from 0.5 to 5 moles and preferably from 0.7 to 2 moles of the silicon-bonded hydrogen atoms in this component per 1 mole of the alkenyl groups in component (A). The reasons for this are as follows: the thermal expansion coefficient of the resulting cured product is substantially reduced when the content of component (B) is at least as large as the lower limit for the indicated range, while the mechanical strength of the resulting cured product is elevated when the upper limit for the indicated range is not exceeded.

Component (C) is a hydrosilylation reaction catalyst for accelerating the hydrosilylation reaction between the alkenyl groups and the silicon-bonded hydrogen atoms in the present composition. Component (C) can be exemplified by platinum catalysts, rhodium catalysts, and palladium catalysts. Platinum catalysts are preferred for component (C) because they can substantially accelerate the cure of the present composition. These platinum catalysts can be exemplified by finely divided platinum powder, chloroplatinic acid, alcohol solutions of chloroplatinic acid, platinum-alkenylsiloxane complexes, platinum-olefin complexes, and platinum-carbonyl complexes. The alkenylsiloxane can be exemplified by 1,3-divinyl-1,1,3,3-tetramethyldisiloxane, 1,3,5,7-tetramethyl-1,3,5,7-tetravinylcyclotetrasiloxane, alkenylsiloxanes provided by replacing a portion of the methyl in the preceding alkenylsiloxanes with, for example, ethyl or phenyl, and alkenylsiloxanes provided by replacing the vinyl group in the preceding alkenylsiloxanes with, for example, the allyl group or hexenyl group. Moreover, the stability of this platinum-alkenylsiloxane complex can be enhanced by the addition to the complex of an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, 1,3,5,7-tetramethyl-1,3,5,7-tetravinylcyclotetrasiloxane, and so forth, or an organosiloxane oligomer such as a dimethylsiloxane oligomer and so forth, and this addition is therefore preferred.

The content of component (C) is a catalytic quantity, and the content is not otherwise particularly limited as long as it is a quantity sufficient to accelerate the hydrosilylation reaction. The content of component (C), expressed with reference to the present composition, is preferably a quantity that provides from 0.01 to 500 mass-ppm of the metal atom in this component, more preferably a quantity that provides from 0.01 to 100 mass-ppm of the metal atom in this component, and particularly preferably a quantity that provides from 0.01 to 50 mass-ppm of the metal atom in this component. The reasons for this are as follows: the resulting composition exhibits an excellent cure when the content of component (E) is at least as large as the lower limit on the indicated range, while the generation of color in the resulting cured product is inhibited when the upper limit on the indicated range is not exceeded.

The present composition comprises components (A), (B), and (C) described above, but may contain (D) an organopolysiloxane that contains at least two alkenyl groups in one molecule, but excluding component (A), as an additional optional component.

Component (D) can be exemplified by straight-chain organopolysiloxanes and branched-chain organopolysiloxanes. The straight-chain organopolysiloxane has alkenyl, e.g., vinyl, allyl, isopropenyl, butenyl, hexenyl, cyclohexenyl, and so forth, bonded to the silicon in the molecular chain, while the other groups bonded to the silicon in the molecular chain can be exemplified by alkyl such as methyl, ethyl, and propyl; aryl such as phenyl, tolyl, and xylyl; aralkyl such as benzyl and phenethyl; and halogenated alkyl such as 3-chloropropyl and 3,3,3-trifluoropropyl. Specific examples are straight-chain organopolysiloxanes such as a dimethylpolysiloxane chain-stopped by dimethylvinylsiloxy groups at both molecular chain terminals, a dimethylsiloxane/methylvinylsiloxane random copolymer chain-stopped by dimethylvinylsiloxy groups at both molecular chain terminals, a dimethylsiloxane/methylphenylsiloxane copolymer chain-stopped by dimethylvinylsiloxy groups at both molecular chain terminals, a dimethylsiloxane/methylvinylsiloxane random copolymer chain-stopped by trimethylsiloxy groups at both molecular chain terminals, and mixtures of two or more of the preceding.

The branched-chain organopolysiloxane can be exemplified by a branched-chain organopolysiloxane comprising: a siloxane unit represented by the formula: $SiO_{4/2}$, a siloxane unit represented by the general formula: $R^1_2R^2SiO_{1/2}$, and a siloxane unit represented by the general formula: $R^1_3SiO_{1/2}$. $R^1$ in these formulas is a $C_{1-6}$ alkyl group or a phenyl group. The alkyl groups represented by $R^1$ can be exemplified by the same groups as indicated above. $R^2$ in these formulas is a $C_{2-10}$ alkenyl group and can be exemplified by the same groups as indicated above. The sum of the siloxane unit represented by the general formula: $R^1_2R^2SiO_{1/2}$ and the siloxane unit represented by the general formula: $R^1_3SiO_{1/2}$ per siloxane unit represented by the formula: $SiO_{4/2}$ is preferably in the range from 0.5 to 1.5 in this organopolysiloxane. In addition, a very small amount of, for example, the hydroxyl group, an alkoxy group, and so forth, may be bonded to the silicon in the molecule in this organopolysiloxane.

The content of component (D) is not particularly limited, but is preferably an amount whereby the alkenyl groups in this component are not more than 10 mole % of the total amount of the alkenyl groups in component (A) and the alkenyl groups in this component. The reason for this is that the thermal expansion coefficient of the resulting cured product is substantially reduced when the content of this component does not exceed the upper limit for the indicated range.

The present composition may also contain (E) an inorganic filler as another optional component. Component (E) can be exemplified by inorganic fillers such as fumed silica, precipitated silica, calcined silica, fused silica, finely divided quartz powder, calcium carbonate, titanium dioxide, diatomaceous earth, aluminum hydroxide, finely particulate alumina, magnesia, zinc oxide, zinc carbonate, finely divided metal powder, and so forth, and by inorganic fillers provided by subjecting the aforementioned fillers to a surface treatment with, for example, a silane, a silazane, a siloxane with a low degree of polymerization, an organic compound, and so forth.

The content of component (E) is not particularly limited, but is preferably at most 90 mass % of the present composition because this provides the present composition with excellent handling characteristics.

The present composition preferably also contains (F) a reaction inhibitor in order to provide a suitable control of the curing reaction rate. Component (F) can be exemplified by alkyne alcohols such as 1-ethynylcyclohexanol, 2-methyl-3-butyn-2-ol, 3,5-dimethyl-1-hexyn-3-ol, and 2-phenyl-3-butyn-2-ol; ene-yne compounds such as 3-methyl-3-penten-1-yne and 3,5-dimethyl-3-hexen-1-yne; as well as 1,3,5,7-tetramethyl-1,3,5,7-tetravinylcyclotetrasiloxane, 1,3,5,7-tetramethyl-1,3,5,7-tetrahexenylcyclotetrasiloxane, and benzotriazole. While there are no limitations on the content of component (F), the content is preferably in the range from 1 to 5,000 mass-ppm with reference to the present composition.

The present composition preferably also contains (G) an adhesion promoter in order to bring about additional improvement in the adhesiveness to the substrate with which the composition is in contact during the cure of the composition. Component (G) can be exemplified by organosilanes or organosiloxane oligomers that have from about 4 to 20 silicon atoms and a straight-chain structure, branched structure, or cyclic structure in either case that contain a trialkoxysiloxy group (for example, a trimethoxysiloxy group or a triethoxysiloxy group) or a trialkoxysilylalkyl group (for example, a trimethoxysilylethyl group or a triethoxysilylethyl group) and a hydrosilyl group or an alkenyl group (for example, a vinyl group or an allyl group); organosilanes or organosiloxane oligomers that have from about 4 to 20 silicon atoms and a straight-chain structure, branched structure, or cyclic structure in either case that contain a trialkoxysiloxy group or trialkoxysilylalkyl group and a methacryloxyalkyl group (for example, a 3-methacryloxypropyl group); organosilanes or organosiloxane oligomers that have from about 4 to 20 silicon atoms and a straight-chain structure, branched structure, or cyclic structure in either case that contain a trialkoxysiloxy group or a trialkoxysilylalkyl group and an epoxy-functional alkyl group (for example, the 3-glycidoxypropyl group, 4-glycidoxybutyl group, 2-(3,4-epoxycyclohexyl)ethyl group, 3-(3,4-epoxycyclohexyl)propyl group); the reaction products of an aminoalkyltrialkoxysilane and an epoxy-functional alkyltrialkoxysilane; and epoxy-functional ethyl polysilicates. The adhesion promoter can be specifically exemplified by vinyltrimethoxysilane, allyltrimethoxysilane, allyltriethoxysilane, hydrogentriethoxysilane, 3-glycidoxypropyltrimethoxysilane, 3-glycidoxypropyltriethoxysilane, 2-(3,4-epoxycyclohexyl)ethyltrimethoxysilane, 3-methacryloxypropyltrimethoxysilane, 3-methacryloxypropyltriethoxysilane, the reaction product of 3-glycidoxypropyltriethoxysilane and 3-aminopropyltriethoxysilane, the condensation reaction product of a silanol group-endblocked methylvinylsiloxane oligomer and 3-glycidoxypropyltrimethoxysilane, the condensation reaction product of a silanol group-endblocked methylvinylsiloxane oligomer and 3-methacryloxypropyltriethoxysilane, and tris(3-trimethoxysilylpropyl) isocyanurate. While there are no limitations on the content of component (G), the content is preferably in the range from 0.1 to 10 parts by mass per 100 parts by mass of the total amount of components (A) and (B).

The viscosity of the present composition at 25° C. is not particularly limited, but is preferably in the range from 100 to 1,000,000 mPa·s, more preferably in the range from 500 to 500,000 mPa·s, and particularly preferably in the range from 1,000 to 200,000 mPa·s. The reason for this is that the handling characteristics of the obtained composition are excellent when the viscosity is at least as large as the lower limit on the indicated range and does not exceed the upper limit on the indicated range.

The cured product of the present invention will now be described in detail.

The cured product of the present invention characteristically is a cured product provided by the cure of the hereinabove-described composition and has a low thermal expansion coefficient. The value of the thermal expansion coefficient of the cured product of the present composition cannot be strictly limited because it will vary with, inter alia, the type, content, shape, and particle size of the inorganic filler and the hardness of the cured material. However, for example, the cured product lacking inorganic filler preferably has an average linear thermal expansion coefficient in the temperature range from 25° C. to 200° C., as measured by the method specified in JIS K 7197-1991, "Testing method for linear thermal expansion coefficient of plastics by thermomechanical analysis", of not more than 200 ppm/° C., while in the case of the cured product containing inorganic filler, the average linear thermal expansion coefficient in the range from 25° C. to 200° C. is preferably not more than 100 ppm/° C.

EXAMPLES

The curable silicone composition and cured product thereof according to the present invention will now be described in detail through examples. The viscosity is the value at 25° C. Me, Ph, and Vi in the formulas respectively represent a methyl group, phenyl group, and a vinyl group. The hardness, bending strength, and linear thermal expansion coefficient of the cured product were measured as follows.

The Hardness of the Cured Product

A cured product was formed by curing the curable silicone composition by heating for 2 hours at 150° C. The hardness of this cured product was measured using the type D durometer specified in JIS K 7215-1986, "Testing methods for durometer hardness of plastics".

The Bending Strength of the Cured Product

A cured product was formed by curing the curable silicone composition by heating for 2 hours at 150° C. The bending strength of this cured product was measured by the method specified in JIS K 6911-1995, "Testing methods for thermosetting plastics".

The Linear Thermal Expansion Coefficient of the Cured Product

A cured product was formed by curing the curable silicone composition by heating for 2 hours at 150° C. The linear thermal expansion coefficient of this cured product was measured by the method specified in JIS K 7197-1991, "Testing method for linear thermal expansion coefficient of plastics by thermomechanical analysis".

Practical Example 1

A curable silicone composition with a viscosity of 54 Pa·s was prepared by mixing the following: 5.76 parts by mass of a methylvinylpolysiloxane composed of a methylvinylpolysiloxane block represented by the following formula:

-(MeViSiO)$_{20}$- and chain-stopped at both molecular chain terminals by hydroxyl groups, thus yielding a content for the methylvinylpolysiloxane block of this component, with reference to the total amount of organopolysiloxane in this composition, of 32.4 mass %; 5.93 parts by mass of a methylhydrogenpolysiloxane composed of a methylhydrogenpolysiloxane block represented by the following formula:

-(MeHSiO)$_{50}$- and chain-stopped at both molecular chain terminals by trimethylsiloxy groups, this being a quantity that provided 1.4 moles of the silicon-bonded hydrogen atoms in this component per 1 mole of the vinyl groups in the methylvinylpolysiloxane indicated above; 5.93 parts by mass of a dimethylpolysiloxane represented by the following formula:

Me$_2$ViSiO(Me$_2$SiO)$_{160}$SiMe$_2$Vi and chain-stopped at both molecular chain terminals by dimethylvinylsiloxy groups; 1.08 parts by mass of a condensation reaction product from a dimethylsiloxane/methylvinylsiloxane co-oligomer chain-stopped at both molecular chain terminals by hydroxyl groups and having a viscosity of 20 mPa·s and 3-glycidoxypropyltrimethoxysilane in a mass ratio of 1:2; 25.0 parts by mass of a titanium oxide having an average primary particle size of 0.2 μm (SX-3103 from Sakai Chemical Industry Co., Ltd.); 56.3 parts by mass of a spherical silica having an average particle size of 15 μm (HS-202 from Nippon Steel Materials Co., Ltd., Micron Co.); a 1,3-divinyl-1,1,3,3-tetramethyldisiloxane solution of platinum/1,3-divinyl-1,1,3,3-tetramethyldisiloxane, in a quantity that provided 3.5 mass-ppm platinum metal with reference to this composition; and 1-ethynylcyclohexanol in a quantity that provided 200 mass-ppm with reference to this composition.

A cured product of this composition had a type D durometer hardness of 75, a bending strength of 19 MPa, and an average linear thermal expansion coefficient in the temperature range from 25° C. to 200° C. of 18 ppm/° C.

Practical Example 2

A curable silicone composition with a viscosity of 74 Pa·s was prepared by mixing the following: 7.70 parts by mass of a methylvinylpolysiloxane composed of a methylvinylpolysiloxane block represented by the following formula:

-(MeViSiO)$_{20}$- and chain-stopped at both molecular chain terminals by hydroxyl groups, thus yielding a content for the methylvinylpolysiloxane block of this component, with reference to the total amount of organopolysiloxane in this composition, of 32.4 mass %; 7.70 parts by mass of a methylhydrogenpolysiloxane composed of a methylhydrogenpolysiloxane block represented by the following formula:

-(MeHSiO)$_{50}$- and chain-stopped at both molecular chain terminals by trimethylsiloxy groups, this being a quantity that provided 1.4 moles of the silicon-bonded hydrogen atoms in this component per 1 mole of the vinyl groups in the methylvinylpolysiloxane indicated above; 8.10 parts by mass of a dimethylpolysiloxane represented by the following formula:

Me$_2$ViSiO(Me$_2$SiO)$_{160}$SiMe$_2$Vi and chain-stopped at both molecular chain terminals by dimethylvinylsiloxy groups; 1.50 parts by mass of a condensation reaction product from a dimethylsiloxane/methylvinylsiloxane co-oligomer chain-stopped at both molecular chain terminals by hydroxyl groups and having a viscosity of 20 mPa·s and 3-glycidoxypropyltrimethoxysilane in a mass ratio of 1:2; 75.0 parts by mass of a spherical silica having an average particle size of 15 μm (HS-202 from Nippon Steel Materials Co., Ltd., Micron Co.); a 1,3-divinyl-1,1,3,3-tetramethyldisiloxane solution of platinum/1,3-divinyl-1,1,3,3-tetramethyldisiloxane, in a quantity that provided 3.5 mass-ppm platinum metal with reference to this composition; and 1-ethynylcyclohexanol in a quantity that provided 200 mass-ppm with reference to this composition.

A cured product of this composition had a type D durometer hardness of 72, a bending strength of 13 MPa, and an average linear thermal expansion coefficient in the temperature range from 25° C. to 200° C. of 30 ppm/° C.

Practical Example 3

A curable silicone composition with a viscosity of 1.3 Pa·s was prepared by mixing the following: 36.0 parts by mass of a methylvinylpolysiloxane composed of a methylvinylpolysiloxane block represented by the following formula:

-(MeViSiO)$_6$- and chain-stopped at both molecular chain terminals by hydroxyl groups, thus yielding a content for the methylvinylpolysiloxane block of this component, with reference to the total amount of organopolysiloxane in this composition, of 34.8 mass %; 32.0 parts by mass of a methylhydrogenpolysiloxane composed of a methylhydrogenpolysiloxane block represented by the following formula:

-(MeHSiO)$_{50}$- and chain-stopped at both molecular chain terminals by trimethylsiloxy groups, this being a quantity that provided 1.3 moles of the silicon-bonded hydrogen atoms in this component per 1 mole of the vinyl groups in the methylvinylpolysiloxane indicated above; 11.0 parts by mass of a dimethylpolysiloxane represented by the following formula:

Me$_2$ViSiO(Me$_2$SiO)$_{46}$SiMe$_2$Vi and chain-stopped at both molecular chain terminals by dimethylvinylsiloxy groups; 21.0 parts by mass of a methylvinylpolysiloxane represented by the following average unit formula:

(Me$_2$ViSiO$_{1/2}$)$_{0.08}$(Me$_3$SiO$_{1/2}$)$_{0.42}$(SiO$_{4/2}$)$_{0.50}$(HO$_{1/2}$)$_{0.02}$;

a 1,3-divinyl-1,1,3,3-tetramethyldisiloxane solution of platinum/1,3-divinyl-1,1,3,3-tetramethyldisiloxane, in a quantity that provided 5.0 mass-ppm platinum metal with reference to this composition; and 1-ethynylcyclohexanol in a quantity that provided 300 mass-ppm with reference to this composition.

A cured product of this composition had a type D durometer hardness of 62, a bending strength of 4.5 MPa, and an average linear thermal expansion coefficient in the temperature range from 25° C. to 200° C. of 197 ppm/° C.

Practical Example 4

A curable silicone composition with a viscosity of 68 Pa·s was prepared by mixing the following: 9.60 parts by mass of a methylvinylpolysiloxane composed of a methylvinylpolysiloxane block represented by the following formula:

-(MeViSiO)$_6$- and chain-stopped at both molecular chain terminals by hydroxyl groups, thus yielding a content for the methylvinylpolysiloxane block of this component, with reference to the total amount of organopolysiloxane in this composition, of 31.4 mass %; 8.70 parts by mass of a methylhydrogenpolysiloxane composed of a methylhydrogenpolysiloxane block represented by the following formula:

-(MeHSiO)$_{50}$- and chain-stopped at both molecular chain terminals by trimethylsiloxy groups, this being a quantity that provided 1.3 moles of the silicon-bonded hydrogen atoms in this component per 1 mole of the vinyl groups in the methylvinylpolysiloxane indicated above; 4.2 parts by mass of a dimethylpolysiloxane represented by the following formula:

Me$_2$ViSiO(Me$_2$SiO)$_{46}$SiMe$_2$Vi and chain-stopped at both molecular chain terminals by dimethylvinylsiloxy groups; 7.0 parts by mass of a methylvinylpolysiloxane represented by the following average unit formula:

(Me$_2$ViSiO$_{1/2}$)$_{0.08}$(Me$_3$SiO$_{1/2}$)$_{0.42}$(SiO$_{4/2}$)$_{0.50}$(HO$_{1/2}$)$_{0.02}$;

70.0 parts by mass of a titanium oxide having an average primary particle size of 0.2 μm (SX-3103 from Sakai Chemical Industry Co., Ltd.); a 1,3-divinyl-1,1,3,3-tetramethyldisiloxane solution of platinum/1,3-divinyl-1,1,3,3-tetramethyldisiloxane, in a quantity that provided 3.0 mass-ppm platinum metal with reference to this composition; and 1-ethynylcyclohexanol in a quantity that provided 200 mass-ppm with reference to this composition.

A cured product of this composition had a type D durometer hardness of 87, a bending strength of 20 MPa, and an average linear thermal expansion coefficient in the temperature range from 25° C. to 200° C. of 52 ppm/° C.

Practical Example 5

A curable silicone composition with a viscosity of 3.5 Pa·s was prepared by mixing the following: 76.0 parts by mass of a methylvinylsiloxane/methylphenylsiloxane block copolymer chain-stopped at both molecular chain terminals by trimethylsiloxy groups, in which five methylvinylpolysiloxane blocks represented by the following formula:

-(MeViSiO)$_6$- were bonded in alternation with five methylphenylpolysiloxane blocks represented by the following formula:

-(MePhSiO)$_6$-, thus yielding a content for the methylvinylpolysiloxane block of this component, with reference to the total amount of organopolysiloxane in this composition, of 28.7 mass %; 24.0 parts by mass of a methylhydrogenpolysiloxane composed of a methylhydrogenpolysiloxane block represented by the following formula:

-(MeHSiO)$_{20}$- and chain-stopped at both molecular chain terminals by trimethylsiloxy groups, this being a quantity that provided 1.1 moles of the silicon-bonded hydrogen atoms in this component per 1 mole of the vinyl groups in the methylvinylsiloxane/methylphenylsiloxane block copolymer indicated above; a 1,3-divinyl-1,1,3,3-tetramethyldisiloxane solution of platinum/1,3-divinyl-1,1,3,3-tetramethyldisiloxane, in a quantity that provided 3.0 mass-ppm platinum metal with reference to this composition; and 1-ethynylcyclohexanol in a quantity that provided 200 mass-ppm with reference to this composition.

A cured product of this composition had a type D durometer hardness of 35 and an average linear thermal expansion coefficient in the temperature range from 25° C. to 200° C. of 140 ppm/° C.

Comparative Example 1

A curable silicone composition with a viscosity of 41 Pa·s was prepared by mixing the following: 8.50 parts by mass of a dimethylsiloxane/methylvinylsiloxane random copolymer chain-stopped at both molecular chain terminals by hydroxyl groups, in which three methylvinylsiloxane units represented by the following formula:

-(MeViSiO)— were randomly bonded with six dimethylpolysiloxane units represented by the following formula:

-(Me$_2$SiO)— thus yielding a content for the methylvinylsiloxane of this component, with reference to the total amount of organopolysiloxane in this composition, of 15.1 mass %; 5.77 parts by mass of a methylhydrogenpolysiloxane composed of a methylhydrogenpolysiloxane block represented by the following formula:

-(MeHSiO)$_{50}$— and chain-stopped at both molecular chain terminals by trimethylsiloxy groups, this being a quantity that provided 2.6 moles of the silicon-bonded hydrogen atoms in this component per 1 mole of the vinyl groups in the dimethylsiloxane/methylvinylsiloxane random copolymer indicated above; 5.92 parts by mass of a dimethylpolysiloxane represented by the following formula:

Me$_2$ViSiO(Me$_2$SiO)$_{160}$SiMe$_2$Vi and chain-stopped at both molecular chain terminals by dimethylvinylsiloxy groups; 1.08 parts by mass of a condensation reaction product from a dimethylsiloxane/methylvinylsiloxane co-oligomer chain-stopped at both molecular chain terminals by hydroxyl groups and having a viscosity of 20 mPa·s and 3-glycidoxypropyltrimethoxysilane in a mass ratio of 1:2; 25.0 parts by mass of a titanium oxide having an average primary particle size of 0.2 μm (SX-3103 from Sakai Chemical Industry Co., Ltd.); 56.3 parts by mass of a spherical silica having an average particle size of 15 μm (HS-202 from Nippon Steel Materials Co., Ltd., Micron Co.); a 1,3-divinyl-1,1,3,3-tetramethyldisiloxane solution of platinum/1,3-divinyl-1,1,3,3-tetramethyldisiloxane, in a quantity that provided 3.5 mass-ppm platinum metal with reference to this composition; and 1-ethynylcyclohexanol in a quantity that provided 200 mass-ppm with reference to this composition.

A cured product of this composition had a type D durometer hardness of 85, a bending strength of 12 MPa, and an average linear thermal expansion coefficient in the temperature range from 25° C. to 200° C. of 26 ppm/° C.

Comparative Example 2

A curable silicone composition with a viscosity of 53 Pa·s was prepared by mixing the following: 3.66 parts by mass of a methylvinylpolysiloxane composed of a methylvinylpolysiloxane block represented by the following formula:

-(MeViSiO)$_{20}$— and chain-stopped at both molecular chain terminals by hydroxyl groups, thus yielding a content for the methylvinylpolysiloxane block of this component, with reference to the total amount of organopolysiloxane in this composition, of 20.6 mass %; 8.05 parts by mass of a methylhydrogensiloxane/dimethylsiloxane random copolymer chain-stopped at both molecular chain terminals by trimethylsiloxy groups, in which three dimethylsiloxane units represented by the following formula:

-(Me$_2$SiO)— were randomly bonded with seven methylhydrogensiloxane units represented by the following formula:

-(MeHSiO)—, this being a quantity that provided 1.7 moles of the silicon-bonded hydrogen atoms in this component per 1 mole of the vinyl groups in the methylvinylpolysiloxane indicated above; 5.91 parts by mass of a dimethylpolysiloxane represented by the following formula:

Me$_2$ViSiO(Me$_2$SiO)$_{160}$SiMe$_2$Vi and chain-stopped at both molecular chain terminals by dimethylvinylsiloxy groups; 1.08 parts by mass of a condensation reaction product from a dimethylsiloxane/methylvinylsiloxane co-oligomer chain-stopped at both molecular chain terminals by the hydroxyl group and having a viscosity of 20 mPa·s and 3-glycidoxypropyltrimethoxysilane in a mass ratio of 1:2; 25.0 parts by mass of a titanium oxide having an average primary particle size of 0.2 μm (SX-3103 from Sakai Chemical Industry Co., Ltd.); 56.3 parts by mass of a spherical silica having an average particle size of 15 μm (HS-202 from Nippon Steel Materials Co., Ltd., Micron Co.); a 1,3-divinyl-1,1,3,3-tetramethyldisiloxane solution of platinum/1,3-divinyl-1,1,3,3-tetramethyldisiloxane, in a quantity that provided 3.5 mass-ppm platinum metal with reference to this composition; and 1-ethynylcyclohexanol in a quantity that provided 200 mass-ppm with reference to this composition.

A cured product of this composition had a type D durometer hardness of 77, a bending strength of 10 MPa, and an average linear thermal expansion coefficient in the temperature range from 25° C. to 200° C. of 30 ppm/° C.

Comparative Example 3

A curable silicone composition with a viscosity of 2.2 Pa·s was prepared by mixing the following: 27.7 parts by mass of a methylvinylpolysiloxane composed of a methylvinylpolysiloxane block represented by the following formula:

-(MeViSiO)$_6$— and chain-stopped at both molecular chain terminals by hydroxyl groups, thus yielding a content for the methylvinylpolysiloxane block of this component, with reference to the total amount of organopolysiloxane in this composition, of 26.8 mass %; 40.3 parts by mass of a methylhydrogenpolysiloxane represented by the following average unit formula:

(Me$_2$HSiO$_{1/2}$)$_{0.65}$(SiO$_{4/2}$)$_{0.35}$, this being a quantity that provided 1.3 moles of the silicon-bonded hydrogen atoms in this component per 1 mole of the vinyl groups in the methylvinylpolysiloxane indicated above; 11.0 parts by mass of a dimethylpolysiloxane represented by the following formula:

Me$_2$ViSiO(Me$_2$SiO)$_{46}$SiMe$_2$Vi and chain-stopped at both molecular chain terminals by dimethylvinylsiloxy groups; 21.0 parts by mass of a methylvinylpolysiloxane represented by the following average unit formula:

$(Me_2ViSiO_{1/2})_{0.08}(Me_3SiO_{1/2})_{0.42}(SiO_{4/2})_{0.50}$
$(HO_{1/2})_{0.02}$;

a 1,3-divinyl-1,1,3,3-tetramethyldisiloxane solution of platinum/1,3-divinyl-1,1,3,3-tetramethyldisiloxane, in a quantity that provided 5.0 mass-ppm platinum metal with reference to this composition; and 1-ethynylcyclohexanol in a quantity that provided 300 mass-ppm with reference to this composition.

A cured product of this composition had a type D durometer hardness of 64, a bending strength of 5.2 MPa, and an average linear thermal expansion coefficient in the temperature range from 25° C. to 200° C. of 227 ppm/° C.

Comparative Example 4

A curable silicone composition with a viscosity of 54 Pa·s was prepared by mixing the following: 9.40 parts by mass of 1,3,5,7-tetramethyl-1,3,5,7-tetravinylcyclotetrasiloxane, thus yielding a content for the methylvinylsiloxane of this component, with reference to the total amount of organopolysiloxane in this composition, of 31.9 mass %; 8.90 parts by mass of a methylhydrogenpolysiloxane composed of a methylhydrogenpolysiloxane block represented by the following formula:

-(MeHSiO)$_{50}$— and chain-stopped at both molecular chain terminals by trimethylsiloxy groups, this being a quantity that provided 1.2 moles of the silicon-bonded hydrogen atoms in this component per 1 mole of the vinyl groups in the cyclotetrasiloxane indicated above; 4.2 parts by mass of a dimethylpolysiloxane represented by the following formula:

Me$_2$ViSiO(Me$_2$SiO)$_{46}$SiMe$_2$Vi and chain-stopped at both molecular chain terminals by dimethylvinylsiloxy groups; 7.0 parts by mass of a methylvinylpolysiloxane represented by the following average unit formula:

$(Me_2ViSiO_{1/2})_{0.08}(Me_3SiO_{1/2})_{0.42}(SiO_{4/2})_{0.50}$
$(HO_{1/2})_{0.02}$;

70.0 parts by mass of a titanium oxide having an average primary particle size of 0.2 μm (SX-3103 from Sakai Chemical Industry Co., Ltd.); a 1,3-divinyl-1,1,3,3-tetramethyldisiloxane solution of platinum/1,3-divinyl-1,1,3,3-tetramethyldisiloxane, in a quantity that provided 3.0 mass-ppm platinum metal with reference to this composition; and 1-ethynylcyclohexanol in a quantity that provided 200 mass-ppm with reference to this composition.

A cured product from this composition had a type D durometer hardness of 86, a bending strength of 16 MPa, and an average linear thermal expansion coefficient in the temperature range from 25° C. to 200° C. of 113 ppm/° C.

Comparative Example 5

A curable silicone composition with a viscosity of 3.8 Pa·s was prepared by mixing the following: 76.0 parts by mass of a methylvinylsiloxane/methylphenylsiloxane random copolymer chain-stopped at both molecular chain terminals by trimethylsiloxy groups, in which thirty methylvinylpolysiloxane units represented by the following formula:

-(MeViSiO)— were randomly bonded with thirty methylphenylpolysiloxane units represented by the following formula:

-(MePhSiO)—, thus yielding a content for the methylvinylsiloxane of this component, with reference to the total amount of organopolysiloxane in this composition, of 28.7 mass %; 24.0 parts by mass of a methylhydrogenpolysiloxane composed of a methylhydrogenpolysiloxane block represented by the following formula:

-(MeHSiO)$_{20}$— and chain-stopped at both molecular chain terminals by trimethylsiloxy groups, this being a quantity that provided 1.1 moles of the silicon-bonded hydrogen atoms in this component per 1 mole of the vinyl groups in the methylvinylsiloxane.methylphenylsiloxane random copolymer indicated above; a 1,3-divinyl-1,1,3,3-tetramethyldisiloxane solution of platinum/1,3-divinyl-1,1,3,3-tetramethyldisiloxane, in a quantity that provided 3.0 mass-ppm platinum metal with reference to this composition; and 1-ethynylcyclohexanol in a quantity that provided 200 mass-ppm with reference to this composition.

A cured product of this composition had a type D durometer hardness of 40 and an average linear thermal expansion coefficient in the temperature range from 25° C. to 200° C. of 230 ppm/° C.

INDUSTRIAL APPLICABILITY

The curable silicone composition of the present invention cures into a cured product that has a low thermal expansion coefficient and as a result is well adapted as a material for use as a composite formed into a single article with another member.

The invention claimed is:

1. A curable silicone composition comprising:
   (A) an organopolysiloxane that has at least a straight-chain polysiloxane block represented by the following general formula:

—(R$^1$R$^2$SiO)$_m$— wherein R$^1$ is a C$_{1-6}$ alkyl group or a phenyl group, R$^2$ is a C$_{2-10}$ alkenyl group, m is a positive number from 5 to 50, and the content of this straight-chain polysiloxane block is 20 to 60 mass % of the total amount of the organopolysiloxane in this composition;
   (B) an organopolysiloxane that has at least a straight-chain polysiloxane block represented by the following general formula:

—(R$^3$HSiO)$_n$— wherein R$^3$ is a C$_{1-6}$ alkyl group or a phenyl group, and n is a positive number from 10 to 100, in a quantity that provides from 0.5 to 5 moles of the silicon-bonded hydrogen atoms in this component per 1 mole of the alkenyl groups in component (A); and
   (C) a hydrosilylation reaction catalyst in a catalytic quantity.

2. The curable silicone composition according to claim 1, further comprising:
   (D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

3. The curable silicone composition according to claim 1, further comprising:
   (E) an inorganic filler at not more than 90 mass % of the composition.

4. The curable silicone composition according to claim 1, that upon curing forms a cured product that has an average linear thermal expansion coefficient in the range from 25° C. to 200° C. of not more than 200 ppm/° C.

5. The curable silicone composition according to claim 1, wherein component (B) is an organopolysiloxane chain-stopped at molecular chain terminals and comprises a straight-chain polysiloxane block represented by the following general formula:

—(R³HSiO)$_n$— wherein R³ is a C$_{1-6}$ alkyl group or a phenyl group, and n is a positive number from 10 to 100.

6. The curable silicone composition according to claim 5, further comprising:
(D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

7. The curable silicone composition according to claim 1, wherein component (A) is an organopolysiloxane in which the molecular chain terminals are chain-stopped and in which a straight-chain polysiloxane block represented by the following general formula:

—(R¹R²SiO)$_m$— wherein R¹ is a C$_{1-6}$ alkyl group or a phenyl group, R² is a C$_{2-10}$ alkenyl group, and m is a positive number from 5 to 50, is connected to a siloxane represented by the following general formula or a polysiloxane comprising a repetition of this siloxane, —(R¹$_2$SiO)— wherein R¹ is a C$_{1-6}$ alkyl group or a phenyl group.

8. The curable silicone composition according to claim 7, further comprising:
(D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

9. The curable silicone composition according to claim 7, wherein component (B) is an organopolysiloxane chain-stopped at molecular chain terminals and comprises a straight-chain polysiloxane block represented by the following general formula:

—(R³HSiO)$_n$— wherein R³ is a C$_{1-6}$ alkyl group or a phenyl group, and n is a positive number from 10 to 100.

10. The curable silicone composition according to claim 9, further comprising:
(D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

11. The curable silicone composition according to claim 1, wherein component (A) is an organopolysiloxane chain-stopped at molecular chain terminals and comprises a straight-chain polysiloxane block represented by the following general formula:

—(R¹R²SiO)$_m$— wherein R¹ is a C$_{1-6}$ alkyl group or a phenyl group, R² is a C$_{2-10}$ alkenyl group, and m is a positive number from 5 to 50.

12. The curable silicone composition according to claim 11, further comprising:
(D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

13. The curable silicone composition according to claim 2, wherein component (B) is an organopolysiloxane chain-stopped at molecular chain terminals and comprises a straight-chain polysiloxane block represented by the following general formula:

—(R³HSiO)$_n$— wherein R³ is a C$_{1-6}$ alkyl group or a phenyl group, and n is a positive number from 10 to 100.

14. The curable silicone composition according to claim 13, further comprising:
(D) an organopolysiloxane that contains at least two alkenyl groups in one molecule, but excluding component (A), in an amount whereby the alkenyl groups in this component are not more than 10 mole % of the total amount of the alkenyl groups in component (A) and the alkenyl groups in this component.

15. A cured product provided by the cure of the curable silicone composition according to claim 1.

* * * * *